United States Patent
Ezaki et al.

(10) Patent No.: US 8,168,136 B2
(45) Date of Patent: May 1, 2012

(54) FLUID-CONVEYING APPARATUS AND METHOD FOR CONVEYING FLUID BY USING THE SAME

(75) Inventors: Takahiro Ezaki, Yokohama (JP); Takeo Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1288 days.

(21) Appl. No.: 11/285,069

(22) Filed: Nov. 23, 2005

(65) Prior Publication Data
US 2006/0115382 A1    Jun. 1, 2006

(30) Foreign Application Priority Data
Nov. 29, 2004    (JP) .................................. 2004-343355

(51) Int. Cl.
*B01L 3/00*    (2006.01)
(52) U.S. Cl. .......... 422/500; 422/501; 422/502; 251/12; 251/61.1; 137/451
(58) Field of Classification Search ............ 422/99–100, 422/500–502; 137/606, 451; 251/12, 61.1
See application file for complete search history.

(56) References Cited

U.S. PATENT DOCUMENTS

| | | | | | |
|---|---|---|---|---|---|
| 5,216,273 | A | * | 6/1993 | Doering et al. | 257/419 |
| 5,261,452 | A | * | 11/1993 | McAndrew et al. | 137/606 |
| 5,937,886 | A | * | 8/1999 | Girard et al. | 137/3 |
| 5,938,119 | A | * | 8/1999 | Yamada et al. | 239/119 |
| 6,003,833 | A | * | 12/1999 | Tasi et al. | 251/11 |
| 6,296,020 | B1 | | 10/2001 | McNeely et al. | 137/806 |
| 2005/0265899 | A1 | | 12/2005 | Imamura et al. | 422/100 |
| 2006/0021651 | A1 | | 2/2006 | Sugioka et al. | 137/112 |
| 2006/0054226 | A1 | | 3/2006 | Yamazaki et al. | 137/827 |

FOREIGN PATENT DOCUMENTS

| | | |
|---|---|---|
| JP | 2003-270252 | 9/2003 |
| WO | WO 98/53311 | 11/1998 |
| WO | WO 2004/079241 | 9/2004 |

* cited by examiner

*Primary Examiner* — Jyoti Nagpaul
(74) *Attorney, Agent, or Firm* — Fitzpatrick, Cella, Harper & Scinto (57) ABSTRACT

A fluid-conveying apparatus conveys fluid using a channel for the fluid to flow. The apparatus includes a pressure-generating device for generating pressure for conveying the fluid, a plurality of processing areas for processing the fluid, a valve which is disposed between the processing areas and controls the fluid flow, and a pressure-relieving device for relieving the pressure in the channel.

17 Claims, 7 Drawing Sheets

FLUID-CONVEYING APPARATUS AND METHOD FOR CONVEYING FLUID BY USING THE SAME

BACKGROUND OF THE INVENTION

1. Field of the Invention

The present invention relates to fluid-conveying apparatuses and methods for conveying fluid using the same. Specifically, the present invention relates to fluid-conveying apparatuses suitable for micro-analysis systems (µ-TAS: Micro-total analysis system) for performing chemical analysis or chemical synthesis on chips.

2. Description of the Related Art

Recently, as stereo-microprocessing technology has been developed, a so-called micro-analysis system, µ-TAS (Micro-total analysis system), or Lab on a Chip has been developed. These systems have elements for conveying fluid, i.e., a channel, a pump, and a valve, and in addition have a sensor. The elements and the sensor are integrated on a substrate of glass, silicon, or the like, and chemical analysis is performed on the substrate. By miniaturizing the chemical analysis system, void volumes can be decreased and the sample amounts required for analysis can be significantly decreased. Furthermore, reduction in analysis time and lower power consumption of the whole system can be achieved. Additionally, price-reduction of the system can be expected by the miniaturization. Thus, in the µ-TAS, the miniaturization of the system, price-reduction, and a large reduction in analysis time are possible, so the µ-TAS is expected to be applied to medical fields, such as home medical care and bedside monitoring, and biotechnological fields, such as DNA analysis and proteome analysis.

In the above-mentioned µ-TAS, various constitutions of valves have been suggested in order to control the fluid flow in the microchannel. Water repellent finishing of a surface of the microchannel can increase the surface tension of the fluid. By utilizing these features, a valve being capable of terminating the fluid flow until the pressure applied to the fluid reaches a predetermined value has been realized (U.S. Pat. No. 6,296,020 B1). Furthermore, Japanese Patent Laid-Open No. 2003-270252 discloses a microchannel provided with a wax-type valve wherein the fluid flow is controlled by heating the valve from the outside of the microchannel. With such valves, a hydraulic circuit being capable of performing a plurality of processes by a simple constitution can be composed by utilizing electrophoresis or centrifugal force as a driving source. Such a hydraulic circuit can reduce the system size as a whole, even if the scale of the hydraulic circuit itself is increased.

However, the valve utilizing the surface tension of fluid and the wax-type valve are poor in terms of pressure resistance. Therefore, when a high-pressure pump is used as a fluid-conveying means, leakage or breakage of the valve may possibly occur resulting in it being difficult to precisely control the fluid flow.

SUMMARY OF THE INVENTION

The present invention provides a fluid-conveying apparatus with excellent pressure resistance using a simple constitution and capable of accurately controlling fluid, and provides a method for conveying fluid.

A fluid-conveying apparatus provided by the present invention conveys fluid using a channel for the fluid to flow and includes a pressure-generating means for generating pressure for conveying the fluid through the channel, a plurality of processing areas for processing the fluid or a sample conveyed through the channel, a valve which is disposed between two of the plurality of the processing areas and controls the fluid flow therethrough, and a pressure-relieving means for relieving pressure in the channel.

In the apparatus according to the present invention, the operation of the valve depends on the pressure difference generated between the upstream side and the downstream side of the valve when the fluid flows in the channel. The valve passes the fluid therethrough when the pressure difference between the upstream side and the downstream side of the valve is lower than a predetermined value and interrupts the fluid flow when the pressure difference between the upstream side and the downstream side of the valve is equal to or higher than the predetermined value.

The apparatus may be provided with a plurality of valves in the channel. The plurality of valves has different threshold values such that when the pressure difference between the upstream and the downstream side of each of the plurality of valves is greater than the threshold therefor, the fluid flow therethrough is interrupted.

In the case that a plurality of valves are provided in the channel, the plurality of valves comprises a first valve and a second valve. The first valve is upstream of the second valve in the channel. The threshold value for the first valve for interrupting the fluid flow is higher than that of the second valve.

The valve may include a spring and a shielding part elastically suspended by the spring. The shielding part is displaced by a pressure difference between the upstream side and the downstream side of the valve and is sufficiently displaced to shield the channel when the pressure difference is equal to or higher than the predetermined value.

The valve may include at least a broad channel region and a narrow channel region. The shielding part is displacably provided in the broad channel region. The valve can interrupt the fluid flow to the narrow channel region by displacing the shielding part so as to shield the narrow channel region.

The valve may be constituted so that the broad channel region is upstream of the narrow channel region. In one embodiment, a chemical reaction or chemical synthesis is performed with the sample conveyed through the channel in the plurality of processing areas. In this case, the fluid conveying apparatus can comprise a micro-array system comprising a substrate in which the channel is disposed and on which pressure-generating means, the plurality of processing areas, the valve, and the pressure-relieving means are disposed. Further, the micro-analysis system can comprise a plurality of substrates, such that in at least one of the substrates the channel in formed, and in at least another one of the substrates the valve is formed.

A method for conveying fluid according to the present invention utilizes a channel for fluid to flow through and includes: a step of providing a fluid-conveying apparatus comprising a pressure-generating means for generating pressure for conveying the fluid through the channel, a plurality of processing areas in the channel for processing the fluid or a sample conveyed through the channel, a valve which is disposed between two of the plurality of the processing areas and controls the fluid flow therethrough, and a pressure-relieving means for relieving pressure in the channel; a step of conveying the fluid to the processing areas as a result of the operation of the pressure-generating means with the valve being opened; a step of closing the valve as a result of the operation of the pressure-generating means; and a step of opening the valve in response to relieving the pressure with the pressure-relieving means.

In the method for conveying fluid according to the present invention, the valve opening step comprises the steps of: generating a pressure difference between the upstream side and the downstream side of the valve in the channel that is lower than a predetermined value with the pressure-relieving means; and opening the valve to allow the fluid to pass therethrough in response to the generation of the pressure difference lower than the predetermined value. The valve closing step comprises the steps of: generating a pressure difference between the upstream side and the downstream side of the valve when the fluid flows in the channel that is equal to or higher than the predetermined value with the pressure-generating means; and closing the valve to interrupt the fluid flow through the valve in response to the generation of the pressure difference between the upstream side and the downstream side of the valve when the fluid flows in the channel that is equal to or higher than the predetermined value.

The method may further comprises the step of conveying the fluid to one of the processing areas by controlling the pressure-generating means so that the pressure difference between the upstream side and the downstream side of the valve is lower than the predetermined pressure difference required to open the valve.

In the method for conveying fluid according to the present invention, the fluid-conveying apparatus may have a plurality of valves in the channel, wherein the plurality of valves have different threshold values for interrupting the fluid flow such that when the pressure difference between the upstream side and the downstream side of each of the plurality of valves is greater than the threshold therefor, the fluid flow therethrough is interrupted. The method may include a step of conveying fluid in the channel by using the pressure-generating means in such a manner that a pressure difference between the upstream side and the downstream side of a first valve is lower than the threshold value of the first valve and a pressure difference between the upstream side and the downstream side of a second valve disposed downstream of the first valve is lower than the threshold value of the second valve. Furthermore, the method may include a step of controlling the fluid flow by using the pressure-generating means in such a manner that a pressure difference between the upstream side and the downstream side of the first valve lower than the threshold value of the first valve allows the first valve to be opened and a pressure difference between the upstream side and the downstream side of the second valve equal to or higher than the threshold value of the second valve allows the second valve to be closed. The method may also include a step of opening the second valve by using the pressure-relieving means so as to relieve the pressure applied to the upstream side of the second valve.

In addition, the valve can comprise a spring and a shielding part elastically suspended by the spring. In this embodiment, the method further comprises the steps of: displacing the shielding part by a pressure difference between the upstream side and the downstream side of the valve; and sufficiently displacing the shielding part to shield the channel when the pressure difference is equal to or higher than the predetermined value. The valve can also include at least a broad channel region and a narrow channel region and the shielding part is displacably provided in the broad channel region. In this embodiment, the method further comprises the step of interrupting the fluid flow to the narrow channel region by displacing the shielding part so as to shield the narrow channel region. The broad channel region can be upstream of the narrow channel region, and in this embodiment, the method further comprises the step of displacing the shielding part in the downstream direction of the fluid flow.

Moreover, the method further comprises the step of performing a chemical reaction or chemical synthesis with the sample conveyed through the channel in the plurality of processing areas. In one embodiment, the fluid-conveying apparatus comprises a micro-analysis system comprising a substrate in which the channel is disposed and on which pressure-generating means, the plurality of processing areas, the valve, and the pressure-relieving means are disposed, and in this embodiment, the method further comprises the step of conveying the fluid through the substrate. In addition, the micro-analysis system can comprise a plurality of the substrates, in at least one of the substrates the channel is formed, and in at least another one of the substrates the valve is formed. In this embodiment, the method further comprises the step of conveying fluid between the at least one substrate and the at least another one of the substrates.

According to the present invention, the fluid flow in a microchannel can be precisely controlled with a simple structure. In particular, the present invention utilizes a pressure-relieving means for relieving pressure in the channel. With the relief of the pressure in the channel by the pressure-relieving means, the opening of the valve can be readily controlled. Furthermore, the apparatus according to the present invention is provided with a pressure-generating means for conveying fluid in addition to the pressure-relieving means. By using these means, the treatment time for the fluid at a processing area, the conveying of the fluid to the next processing area, and the treatment time at the next processing area can be readily controlled.

Further features of the present invention will become apparent from the following description of exemplary embodiments with reference to the attached drawings.

DESCRIPTION OF THE EMBODIMENTS

Embodiments of the present invention will now be described with reference to the drawings. A fluid-conveying apparatus according to the present invention includes a pressure-generating means for generating pressure for conveying fluid, a plurality of processing areas, a valve for controlling the fluid flow, and a pressure-relieving means for relieving the pressure in the channel.

(Description of Fluid-Conveying Apparatus)

Figure 1:
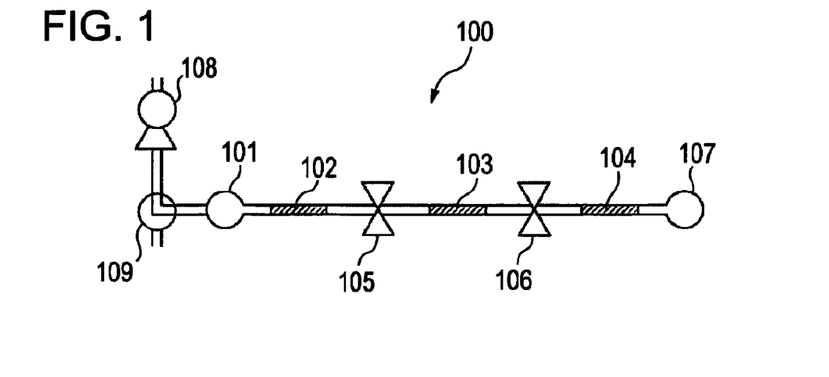
FIG. 1 is a schematic diagram showing a fluid-conveying apparatus according to a first embodiment of the present invention.

A fluid-conveying apparatus shown in FIG. 1 includes a fluid-conveying means 108 as the pressure-generating means for generating pressure for conveying fluid; a first reaction chamber 102, a second reaction chamber 103, and a third reaction chamber 104 as the plurality of processing areas; a first valve 105 and a second valve 106 as the valves; and a pressure-relieving means 109 as the pressure-relieving means for relieving pressure in the channel. Additionally, the fluid-conveying apparatus includes two reservoirs.

FIG. 1 is a schematic diagram showing a fluid-conveying apparatus according to an embodiment of the present invention. The fluid-conveying apparatus 100 shown in FIG. 1 includes a first reservoir 101, a second reservoir 107, the first reaction chamber 102, the second reaction chamber 103, the third reaction chamber 104, a valve 105 corresponding to the first valve, and a valve 106 corresponding to the second valve. The first reservoir 101 is connected to the fluid-conveying means 108, and the pressure-relieving means 109 is connected between the first reservoir 101 and the fluid-conveying means 108. In this embodiment, the pressure-relieving means 109 is disposed on the downstream side of the fluid-conveying means 108 and on the upstream side of the first reaction chamber 102 constituting a processing area. The second reservoir 107 is connected to an exterior container (not shown). A sample is conveyed to the second reservoir 107 by the fluid-conveying means 108 being connected to the reservoir 107 through the first reaction chamber 102, the second reaction chamber 103, and the third reaction chamber 104. In the fluid-conveying apparatus 100, the part of the fluid-conveying apparatus containing the fluid-conveying means 108 is denoted as the upstream side of the apparatus and the part of the fluid-conveying apparatus containing the second reservoir 107 is denoted as the downstream side of the apparatus, and the valve disposed on the upstream side interrupts the fluid flow at a pressure value higher than that of the valve on the downstream side.

The valves 105 and 106 having the following characteristics can be used. When a pressure difference generated between the left side (the upstream side) of the valve in the drawing and the right side (the downstream side) of the valve is equal to or higher than a predetermined threshold value, the valve is closed and the fluid flow is interrupted. When a pressure difference is lower than the threshold value, the valve is opened and the fluid flows. The constitution of valves 105 and 106 will now be described in detail.

(Description of Valve)

Figure 2A:
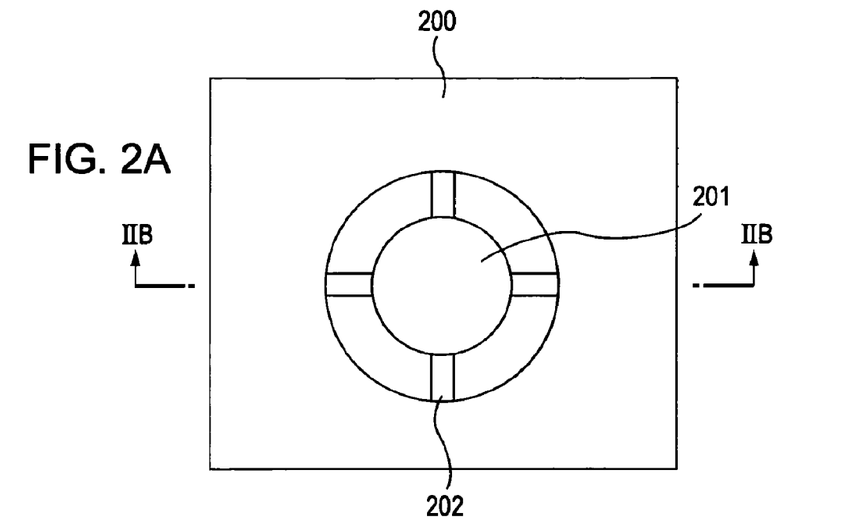
FIG. 2A is a schematic plan view and FIG. 2B is a schematic cross-sectional view of an exemplary valve used in a fluid-conveying apparatus according to the present invention.
Figure 2B:
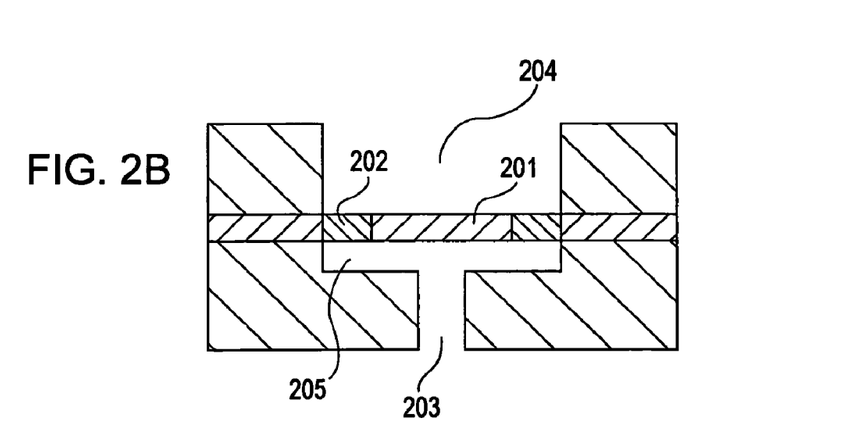

FIGS. 2A and 2B are schematic diagrams of an exemplary constitution of the valve used in a fluid-conveying apparatus according to the present invention. FIG. 2A is a plan view and FIG. 2B is a cross-sectional view of a valve 200. The channel of the valve has a narrow channel region 203 and a broad channel region 204. A shielding part of a flat plate 201 is elastically suspended with springs 202 in the channel 204 so as to extend perpendicular to the direction of fluid flow through the channel 204 and so as to be positioned a certain distance from the inlet of the narrow channel 203. The broad channel region is divided by the flat plate 201 into a channel 204 at the upper side of the flat plate 201 in the drawing and a channel 205 at the lower side of the flat plate 201. The diameter of the flat plate 201 is larger than that of the narrow channel 203. When the flat plate 201 is displaced toward the narrow channel 203 so as to reach the boundary of the narrow channel 203 and the broad channel 205, the fluid flow is interrupted. The valves 105 and 106 of the fluid-conveying apparatus shown in FIG. 1, which are constructed to have the structure of the valve 200, are disposed so that the broad channel 204 shown in FIG. 2B is on the upstream side thereof and the narrow channel 203 is on the downstream side thereof.

Figure 3A:
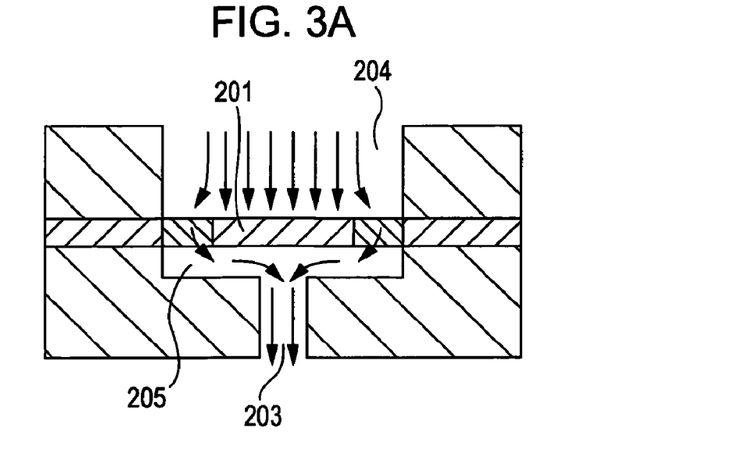
FIGS. 3A, 3B, and 3C are schematic cross-sectional views of the exemplary valve showing a driving step of the valve used in the fluid-conveying apparatus according to the present invention.

FIG. 3A shows a route of the flow of fluid in the valve in the direction from the broad channel 204 to the narrow channel 203. In such a flow, the pressure is reduced when the liquid flows in the channel 205, as compared to when the fluid flows in channel 204. This generates a difference in the pressures applied to the surfaces of the flat plate 201 from the channel 204 side and the channel 205 side. This pressure difference works as a driving force for displacing the flat plate 201 toward the inlet of the narrow channel 203.

Figure 3B:
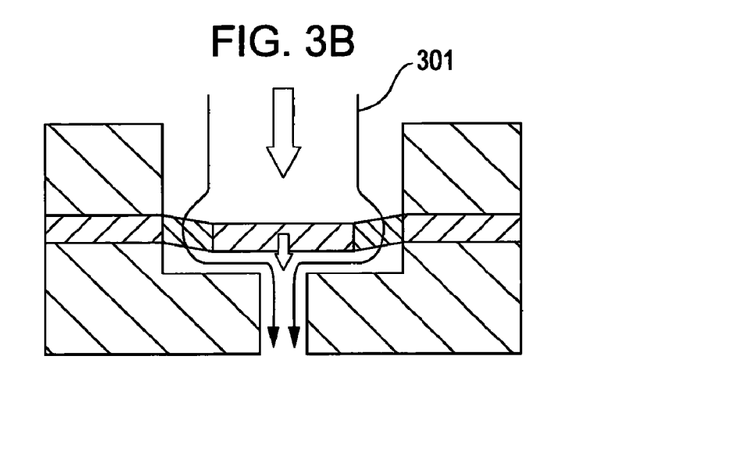

FIG. 3B shows a route of fluid flow in the case that the pressure difference generated by the liquid flow from the broad channel 204 toward the narrow channel 203 is lower than a value required to close the valve. The flat plate 201 is displaced by means of the pressure difference between the channel 204 side and the channel 205 side, but does not reach the narrow channel 203 due to the elasticity of the springs 202 suspending the flat plate 201. Therefore, the inlet of the narrow channel 203 is not closed and the fluid passes through from the broad channel 204 to the narrow channel 203 as shown by reference numeral 301 in the drawing.

Figure 3C:
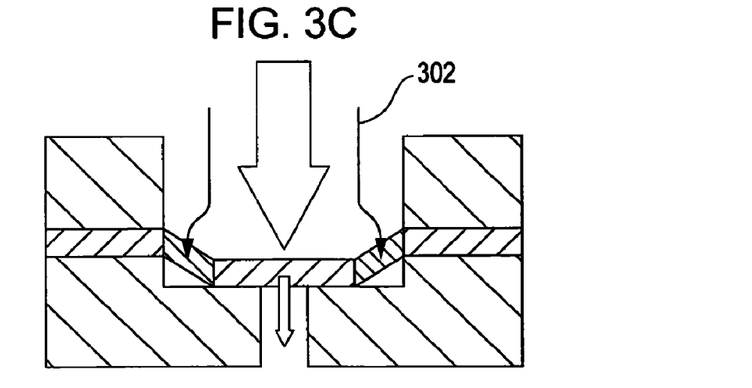

FIG. 3C shows a route for the flow of fluid when a pressure difference generated by the liquid flow from the broad channel 204 toward the narrow channel 203 is equal to or higher than a value required to close the valve. The flat plate 201 is displaced by means of the pressure difference between the channel 204 side and the channel 205 side and reaches the narrow channel 203 to shield the inlet. Consequently, the liquid stays in the channel 204 as shown by reference numeral 302 in the drawing, and the flat plate 201 continues to shield the inlet of the narrow channel 203 by means of the pressure of the liquid. With the relief of the pressure at the upstream side of the valve, the flat plate 201 departs from the inlet of the narrow channel 203 and returns to the initial position by means of the restoring force of the springs 202.

The range of the pressure for driving the valve is determined by the spring constant of the springs 202 and the distance between the flat plate 201 and the narrow channel 203. The spring constant is determined by the length, the thickness, the number, and the material of the springs 202. With the optimization of these factors, the valve can be designed so that the valve is closed and opened within a certain pressure range. When the valve is closed, the flat plate 201 is held by means of the pressure of the fluid. So, a large shielding effect and high strength can be achieved.

The springs 202 and the flat plate 201 are formed of a material resistant to solutions used in chemical analysis or chemical reactions and also resistant to elastic deformation to some degree. For example, silicon can be used. Resins, such as silicone, can also be used. The surfaces of the springs 202 and the flat plate 201 may be coated, if necessary. Other substrates forming the channels can be formed of any material being resistant to the above-mentioned solutions. For example, glass and silicon can be used.

The shielding part can have any shape which can shield the channel 203. In particular, a circular shape is preferable from the viewpoint of symmetry of the fluid flow. The shielding part of the flat plate is spaced a certain distance from the surface of the valve forming the boundary between the channel 205 and the narrow channel 203, which can be a substrate facing the shielding part. A decrease in pressure when the fluid flows in the gap generates a pressure difference between the area above the shielding part and the area below the shielding part. This pressure difference displaces the shielding part toward the substrate.

In this embodiment, a construction in which a shielding part of a flat plate is elastically suspended with leaf springs is described, but the valve used in the present invention is not limited to this. For example, the shielding part may be elastically suspended by fixing one end or both ends of the shielding part as in a cantilever or fixed-end beam.

Since the valve used in the fluid-conveying apparatus according to the present invention is operated by means of the pressure difference of the fluid flowing in the valve, leakage of the sample conveyed occurs. However, the leakage has hardly any influence on the chemical analysis or chemical reaction performed by utilizing the present invention. The reasons for this will be described with reference to FIGS. 2A and 2B. In the valve used in the present invention, the distance between the shielding part 201 and the narrow channel 203 is sufficiently smaller than the diameter of the channel in the valve. This makes the amount of the sample that leaks from the valve negligibly small. Additionally, in order to avoid the influence of the leakage, a channel between the valve and a reaction chamber placed on the downstream side of the valve may be sufficiently lengthened.

(Description of Pressure-Relieving Means)

The pressure-relieving means 109 shown in FIG. 1 can be suitably selected from valves having a leak function. Examples of the valves include a cross valve and a changeover valve. The pressure-relieving means can be disposed downstream of the pressure-generating means and upstream of the processing areas.

(Description of Fluid-Conveying Method)

A method for conveying liquid according to the present invention includes a step of preparing a fluid-conveying apparatus having a pressure-generating means for generating pressure for conveying the fluid, a plurality of processing areas for processing the fluid, a valve which is disposed between the plurality of processing areas and controls the fluid flow, and a pressure-relieving means for relieving pressure in the channel; a step of conveying the fluid to the processing areas by using the pressure-generating means with the valve being opened; a step of closing the valve by using the pressure-generating means; and a step of opening the valve by using the pressure-relieving means.

A liquid-conveying method using a hydraulic circuit for chemical analysis or chemical reactions in which the reaction chambers and the valves are serially connected with each other will now be described. In this case, it is an advantage that the fluid can be precisely controlled with a simple structure, even if the conveying pressure applied to the reaction chambers is high. However, the present invention is not limited to such a configuration. A plurality of the hydraulic circuits may be disposed in parallel on one μ-TAS chip. In such a case, multi-item chemical analysis or chemical reaction in one conveying can be performed. Furthermore, since one liquid-conveying means can cope with a plurality of the hydraulic circuits, the system can be reduced in size in total, even if the number of the hydraulic circuits is increased.

Conveying of a liquid sample by the liquid-conveying method according to the present invention using the fluid-conveying apparatus 100 will now be described.

At first, a method for conveying a liquid when the fluid-conveying apparatus 100 according to the present invention is previously filled with liquid will be described.

FIGS. 4A-4F show a method of conveying a liquid sample 401 in the liquid channel.

Process 4A

The fluid is conveyed by using the fluid-conveying mechanism in such a manner that the pressure difference between the upstream side and the downstream side of a first valve is lower than a predetermined pressure difference for closing the first valve and the pressure difference between the upstream side and the downstream side of a second valve which is disposed on the downstream side of the first valve is lower than a predetermined pressure difference for closing the second valve.

Figure 4A:
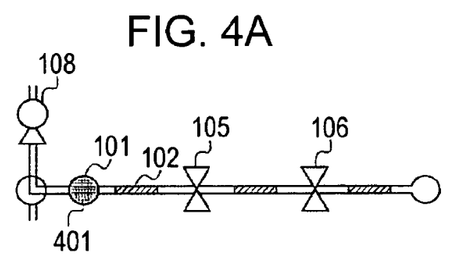
FIGS. 4A-4F are schematic diagrams showing a method for conveying fluid according to an embodiment of the present invention.

With reference to FIG. 4A, liquid is conveyed with the fluid-conveying means 108 in such a manner that the pressure difference generated between the upstream side and the downstream side of the valve 105 is lower than the predetermined pressure difference for closing the valve 105 and the pressure difference generated between the upstream side and the downstream side of the valve 106 is lower than the predetermined pressure difference for closing the valve 106. At this stage, the flow of liquid which is previously present in the channel cannot close the valves 105 and 106. This keeps the valves 105 and 106 open and conveys the liquid sample 401 from the first reservoir 101 toward the valve 105.

Process 4B

In this stage, with the fluid-conveying mechanism, fluid is conveyed in such a manner that the pressure difference between the upstream side and the downstream side of the first valve is equal to or higher than the predetermined pressure difference for closing the first valve.

Figure 4B:
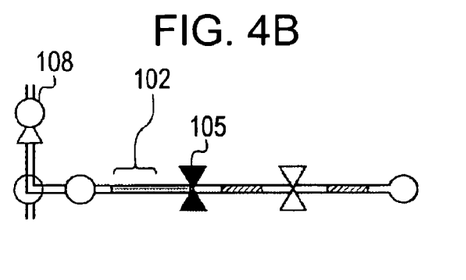

With reference to FIG. 4B, a predetermined amount of the liquid sample 401 is conveyed to the valve 105 during a predetermined time of conveying. At this stage, the liquid is conveyed with the fluid-conveying means 108 in such a manner that a pressure difference generated between the upstream side and the downstream side of the valve 105 is the same as the predetermined pressure difference for closing the valve 105. With this, the valve 105 is closed. The conveying of the liquid is terminated after the confirmation of the valve 105 being closed by monitoring the conveying pressure. In the process shown in FIG. 4B, the liquid sample 401 stays in the first reaction chamber 102.

Process 4C

Here, the pressure at the upstream side of the valve is relieved to open the valve by using a mechanism for relieving the pressure in the channel.

Figure 4C:
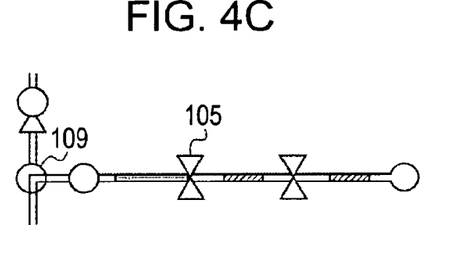

As shown in FIG. 4C, the pressure-relieving means 109 is opened to relieve the pressure at the upstream side of the valve 105. This decreases the pressure difference between the upstream side and the downstream side of the valve 105, and the valve 105 is opened by means of the restoring force of the springs. After the process shown in FIG. 4C, the pressure-relieving means 109 is closed.

Process 4D

At this stage, the liquid is conveyed by the fluid-conveying means in such a manner that the pressure difference between the upstream side and the downstream side of the first valve is lower than the predetermined pressure difference for closing the first valve and the pressure difference between the upstream side and the downstream side of the second valve is equal to or higher than the predetermined pressure difference for closing the second valve. Thus, the second valve is closed while the first valve is opened.

Figure 4D:
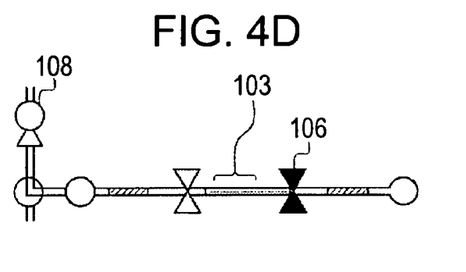

With reference to FIG. 4D, the liquid sample 401 is conveyed to the second reaction chamber 103, as in the process 4A. The liquid sample 401 is conveyed to the second valve 106 during a predetermined time of conveying. At this stage, the liquid is conveyed by the fluid-conveying means 108 in such a manner that the pressure difference between the upstream side and the downstream side of the valve 105 is lower than the predetermined pressure difference for closing the valve 105 and the pressure difference between the upstream side and the downstream side of the valve 106 is equal to or higher than the predetermined pressure difference for closing the valve 106. This keeps the valve 105 open and closes the valve 106. The conveying of the liquid is terminated after the confirmation of the valve 106 being closed by monitoring the conveying pressure. In the process shown in FIG. 4D, the liquid sample 401 stays in the second reaction chamber 103.

Process 4E

At this stage, the valve is opened by relieving the pressure at the upstream side of the valve by using the mechanism for relieving pressure in the channel.

Figure 4E:
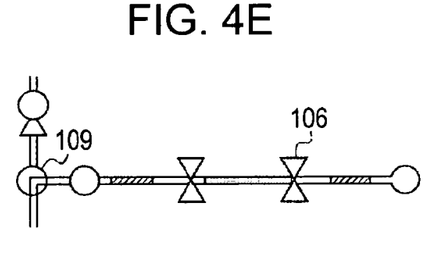

As shown in FIG. 4E, the pressure at the upstream side of the valve 106 is relieved by opening the pressure-relieving means 109. This decreases the pressure difference between the upstream side and the downstream side of the valve 106, and the valve 106 is opened by means of the restoring force of the springs. At this stage, the valve 105 is also opened. After the process shown in FIG. 4E, the pressure-relieving means 109 is closed.

Process 4F

At this stage, the fluid is conveyed by the means for conveying the fluid in such a manner that the pressure difference between the upstream side and the downstream side of the first valve is lower than the predetermined pressure difference for closing the first valve and the pressure difference between the upstream side and the downstream side of the second valve is lower than the predetermined pressure difference for closing the second valve.

Figure 4F:
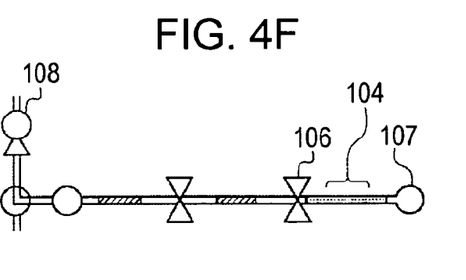

As shown in FIG. 4F, the liquid is conveyed as in the process 4A. This keeps the valves 105 and 106 open and the liquid sample 401 is conveyed to the reservoir 107.

In this example, the conveying of a liquid sample by using the fluid-conveying apparatus 100 previously filled with liquid has been described, but the present invention is not limited to such a case. It is also possible to convey a gas sample when the channel is previously filled with gas.

An example for conveying a liquid sample when the fluid-conveying apparatus 100 according to the present invention is previously filled with gas will now be described. FIGS. 5A-5E show a method of conveying a liquid sample 501 in the channel.

Process 5A

Fluid is here conveyed by a means for conveying the fluid in such a manner that the pressure difference between the upstream side and the downstream side of a first valve is equal to or higher than a predetermined pressure difference for closing the first valve.

Figure 5A:
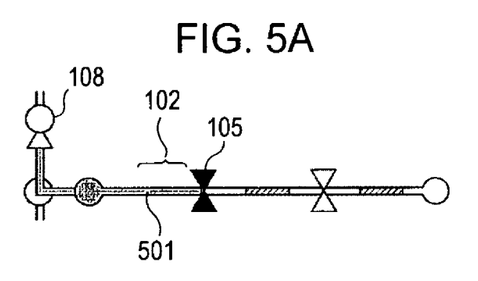
FIGS. 5A-5E are schematic diagrams showing a method for conveying fluid according to another embodiment of the present invention.

As shown in FIG. 5A, the liquid is conveyed by the fluid-conveying means 108 in such a manner that the pressure difference generated between the upstream side and the downstream side of the valve 105 is the predetermined pressure difference for closing the valve 105. This conveys the liquid sample 501 to the first reaction chamber 102. The conveying of the liquid is terminated after the confirmation of the valve 105 being closed by monitoring the conveying pressure. In the process shown in FIG. 5A, the liquid sample 501 stays in the first reaction chamber 102.

The predetermined pressure difference for closing a valve used in the present invention here is determined on the basis of the viscosity of the fluid. The predetermined pressure differences of the valves 105 and 106, for closing the valves, determined by a liquid are substantially lower than that determined by a gas. Therefore, in the process 5A, the valves are not closed even if the gas in the channel flows in the valves 105 and 106.

Process 5B

At this stage, the pressure at the upstream side of the first valve is relieved to open the first valve by using the mechanism for relieving the pressure in the channel.

Figure 5B:
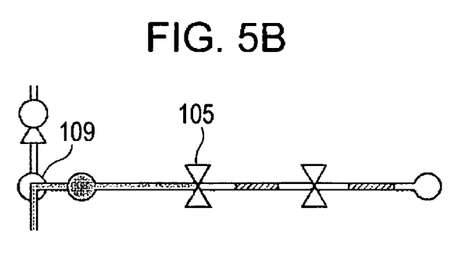

As shown in FIG. 5B, the pressure at the upstream side of the valve 105 is relieved by opening the pressure-relieving means 109. This decreases the pressure difference between the upstream side and the downstream side of the valve 105, and the valve 105 is opened by means of the restoring force of the springs. The pressure-relieving means 109 is closed after the process shown in FIG. 5B.

Process 5C

At this stage, the fluid is conveyed in such a manner that the pressure difference between the upstream side and the downstream side of the first valve is lower than a predetermined pressure difference for closing the first valve and the pressure difference between the upstream side and the downstream side of the second valve disposed on the downstream side of the first valve is equal to or higher than a predetermined pressure difference for closing the second valve.

Figure 5C:
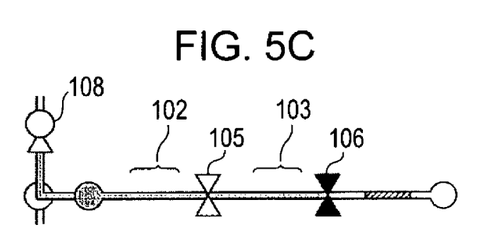

As shown in FIG. 5C, the liquid is conveyed in such a manner that the pressure difference between the upstream side and the downstream side of the valve 105 is lower than the predetermined pressure difference for closing the valve 105 and the pressure difference between the upstream side and the downstream side of the valve 106 is equal to or higher than the predetermined pressure difference for closing the valve 106. This keeps the valve 105 open, and the liquid passes through the valve 105 and is conveyed from the first reaction chamber 102 to the second reaction chamber 103. The liquid sample 501 is injected into the second valve 106, and the second valve 106 is closed. The conveying of the liquid is terminated after the confirmation of the second valve 106 being closed by monitoring the conveying pressure. The sample stays in the second reaction chamber 103 in the process shown in FIG. 5C.

Process 5D

At this stage, the pressure at the upstream side of the second valve is relieved to open the second valve by using the mechanism for relieving the pressure in the channel.

Figure 5D:
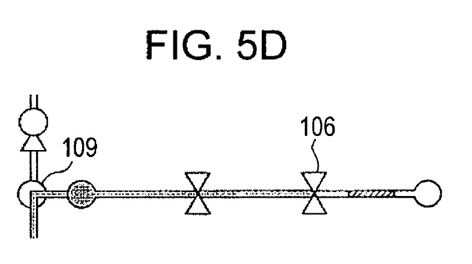

As shown in FIG. 5D, the pressure at the upstream side of the valve 106 is relieved by opening the pressure-relieving means 109. This decreases the pressure difference between the upstream side and the downstream side of the valve 106, and the valve 106 is opened by means of the restoring force of the springs. After the process shown in FIG. 5D, the pressure-relieving means 109 is closed.

Process 5E

At this stage, the liquid is conveyed in such a manner that the pressure difference between the upstream side and the downstream side of the first valve is lower than the predetermined pressure difference for closing the first valve and the pressure difference between the upstream side and the downstream side of the second valve is lower than the predetermined pressure difference for closing the second valve.

Figure 5E:
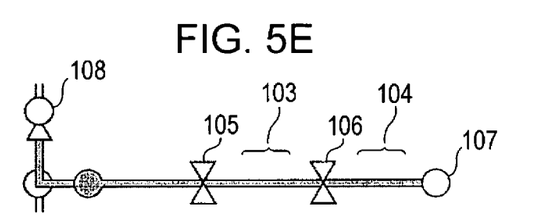

As shown in FIG. 5E, the liquid is conveyed in such a manner that the pressure difference generated between the upstream side and the downstream side of the valve 105 is lower than the predetermined pressure difference for closing the valve 105 and the pressure difference generated between the upstream side and the downstream side of the valve 106 is lower than the predetermined pressure difference for closing the valve 106. This keeps the valves 105 and 106 open, and the liquid sample 501 is conveyed from the second reaction chamber 103 to the third reaction chamber 104 through the valve 106. After the process shown in FIG. 5E, the liquid sample 501 is conveyed to the reservoir 107.

In this example, a hydraulic circuit including valves that are each closed by a pressure difference being equal to or higher than a predetermined value and are disposed in series has been described, but the present invention is not limited to such a hydraulic circuit. For example, in a hydraulic circuit having a channel which branches into a plurality of channels arranged in parallel, the fluid can be also controlled by applying or relieving conveying pressure to the valves.

In this example, a plurality of valves that are closed by a pressure difference being equal to or higher than a predetermined value are used, but the present invention is not limited to such a configuration. A valve that allows fluid to pass through when a pressure difference between the upstream side and the downstream side of the valve is equal to or higher than a predetermined value may be combined with the fluid-conveying apparatus according to the present invention. With this, the fluid flow can be controlled in various ways.

Furthermore, in this example, the conveying of the liquid to the valve is terminated after the confirmation of the closing of the valve by monitoring the conveying pressure, but the present invention is not limited to such a procedure. The conveying of the liquid may be automatically terminated when the conveying-pressure of a pump has reached a predetermined value.

In general, a pump is operated so as to control a pressure for conveying fluid or to control a flow rate. Furthermore, the predetermined pressure difference for closing a valve depends not only on the conveying pressure but also on the flow rate. In this example, the conveying of fluid is controlled by controlling the conveying pressure, but the conveying of the fluid according to the present invention can be equally conducted by controlling the flow rate.

First Embodiment

The embodiment shown in FIG. 1 will be described in more detail. It should be understood that sizes, shapes, and materials in the embodiments are merely shown as examples, but that these can be discretionarily modified within the scope of the present invention.

A method for manufacturing the fluid-conveying apparatus, in which the closing and the opening of a valve are controlled by applying a fluid pressure to the valve and by relieving the fluid pressure, will also be described.

Figure 6A:
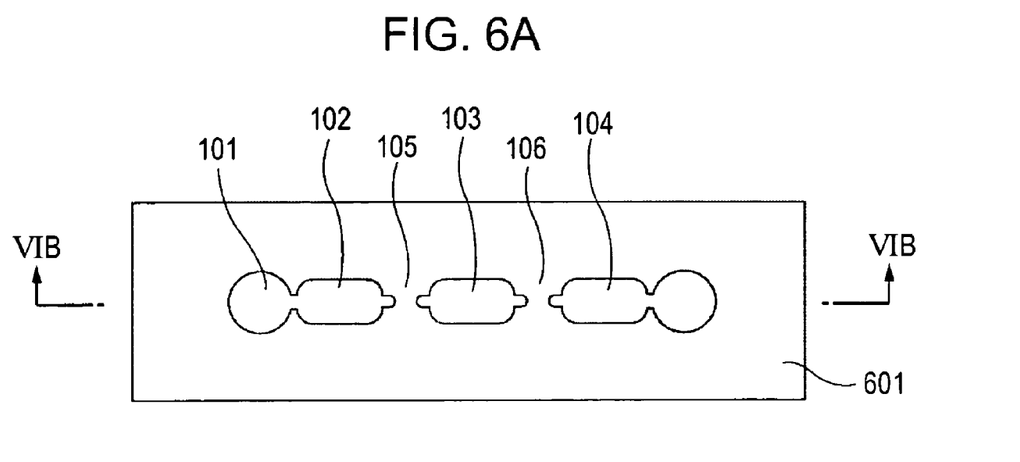
FIG. 6A is a schematic top view and FIG. 6B is a schematic cross-sectional view taken along the line VIB-VIB shown in FIG. 6A, showing the fluid conveying apparatus of FIG. 1 in more detail.
Figure 6B:
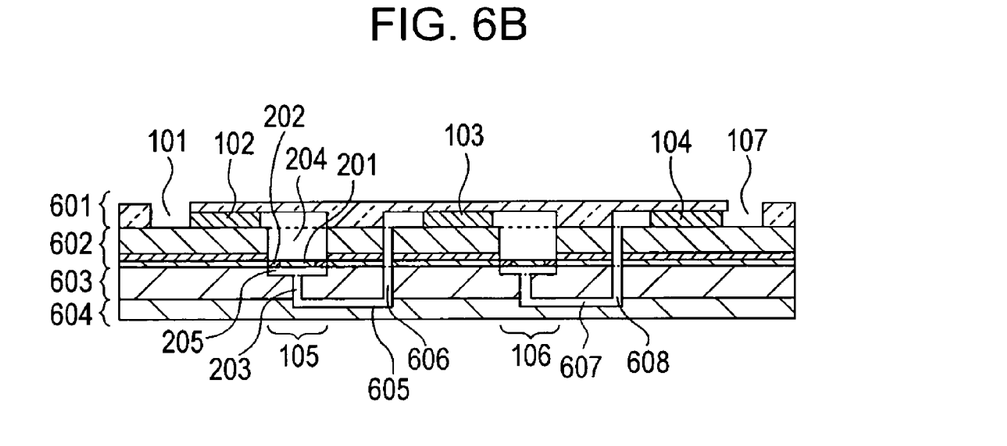

FIGS. 6A and 6B show the fluid-conveying apparatus shown in FIG. 1 in more detail. FIG. 6A is a top view of a channel substrate 601 forming a hydraulic circuit shown in FIG. 1, and FIG. 6B is a cross-sectional view taken along the line VIB-VIB of FIG. 6A.

As shown in FIG. 6B, the fluid conveying apparatus includes a glass channel substrate 601 for forming a channel, a substrate 602 for constituting a movable portion of a valve, a substrate 603 for forming a portion to be shielded with the movable portion of the valve, and a substrate 604 for forming a channel connecting the valve with a part for the next process.

FIG. 6B specifically shows a path in which fluid flows from the reservoir 101 to the reservoir 107 through reaction chambers and valves. After passing through the reservoir 101, the fluid is injected into the first reaction chamber 102, and is then injected into a broad channel region 204 in the valve 105 formed in the substrate 602. A flat plate or movable portion 201 formed in the substrate 602 is displaced to a degree depending on a pressure from the fluid and a spring constant of the springs 202, and then shields an inlet of a narrow channel region 203 in the substrate 603. With this, the fluid stays in the broad channel region 204 in the substrate 602 and does not flow to the channel 203. The flat plate 201 returns to the initial position by means of the restoring force of the springs 202 by opening a leak valve (not shown).

Next, the fluid in the first reaction chamber 102 and the broad channel region 204 is injected into the second reaction chamber 103 through the channels 203, a channel 605, and a channel or through hole 606. Thus, the second reaction chamber 103 is filled with the fluid, and a valve 106 interrupts the flow of the fluid injected in the valve 106 as in the valve 105. The valve 106 is opened by opening a leak valve (not shown) as in the valve 105.

The fluid in the second reaction chamber 103 and the valve 106 is injected into a third reaction chamber 104 through a channel 607 and a channel or through hole 608 and is then discharged to the outside of the system through the reservoir 107.

The exemplary size of each part is as follows: The substrates 601 and 604 have a thickness of 200 to 500 μm, and the substrate 603 has a thickness of 200 μm. The channel formed in the channel substrate 601 has a width of 500 μm and a depth of 20 to 500 μm. The substrate 602 is formed of an SOI substrate and has a thickness of 5 μm/0.5 μm/200 to 500 μm (silicon/silicon oxide film/silicon) (in other words, the thickness of the first silicon layer of the substrate is 5 μm, the thickness of the silicon oxide film is 0.5 μm, and the thickness of the second silicon layer of the substrate is 200 to 500 μm). The channel 203 and through-holes 606 and 608 formed in the substrate 603 have a diameter of 100 μm. The broad channel regions 204 in the valves 105 and 106 have a diameter of 300 μm. The movable portions 201 of the valves 105 and 106 have a diameter of 200 μm and a thickness of 5 μm. The springs of the valves 105 and 106 have a length of 50 to 300 μm, a thickness of 5 μm, and a width of 20 to 40 μm. The length of the broad channel regions 205 in the valves 105 and 106, namely, the distance between the movable portion 201 and the narrow channel 203 when the displacement does not occur, is 5 μm. Each reservoir in the channel substrate 601 has a diameter of 1 mm.

A method for manufacturing the fluid-conveying apparatus according to this example will be described.

The valves are prepared by photolithography and dry etching (for example, plasma etching using SF6 gas and C4F8 gas) of silicon for the substrate 602, the substrate 603, and the substrate 604. The substrates 602, 603, and 604 are thermally bonded.

The channel substrate 601 is prepared by patterning a channel on the glass substrate 601 by photolithography and wet etching (for example, wet etching using HF). The through-holes 606 and 608 are formed by a sandblast process.

The resulting channel substrate 601 and the substrates 602, 603, and 604 for constituting the valves 105 and 106 are bonded by anodic bonding; thus, the fluid-conveying apparatus is manufactured.

Second Embodiment

A system for fluoroimmunoassay of α-fetoprotein (AFP), one of the known tumor markers, will be described as an example of utilizing the fluid-conveying apparatus described in the first embodiment.

Figure 7:
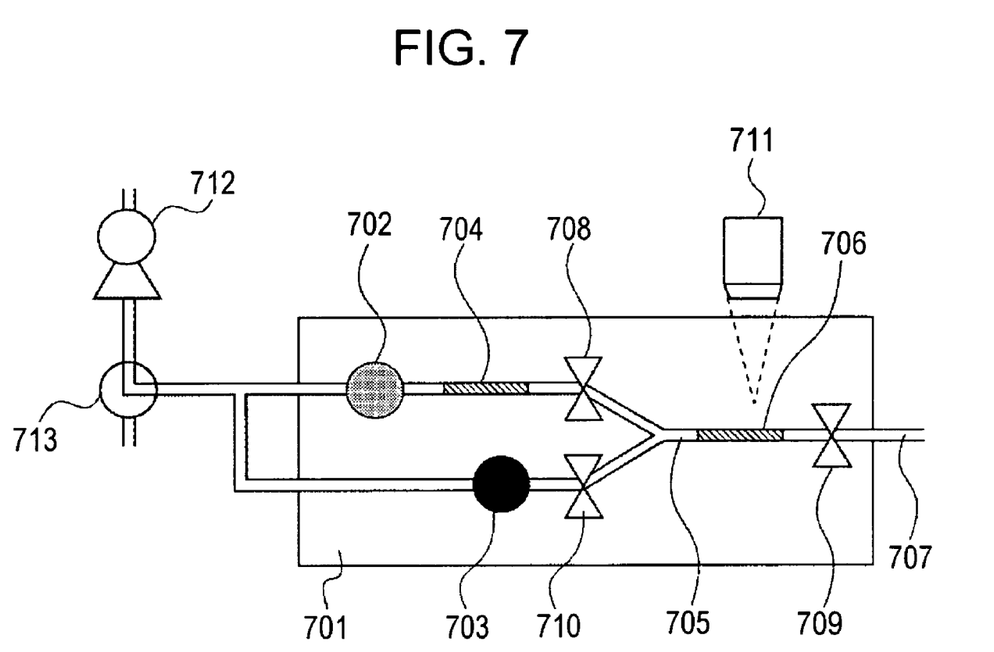
FIG. 7 is a schematic diagram showing a fluid-conveying apparatus according to another embodiment of the present invention.

FIG. 7 is a schematic diagram of the analysis system. Channels are formed on a substrate 701. The system includes a reservoir 702 for a sample, a reservoir 703 for a fluorescein isothiocyanate (FITC)-conjugated rabbit anti-human AFP antibody solution (referred to as labeled antibody, hereinafter), a separation portion 704 for separating blood cells from the sample, a mixing portion 705 for mixing the sample and the labeled antibody, and a reaction portion 706 for conducting an antigen-antibody reaction. A valve 708 is connected between the separation portion 704 and the mixing portion 705, a valve 710 is connected between the reservoir 703 and the mixing portion 705, and a valve 709 is connected between the reaction portion 706 and a waste liquid portion 707. A channel between the reservoir 702 and the separation portion 704 and a channel between the reservoir 703 and the valve 710 have water-repellent surfaces to prevent the leakage of the liquid in the reservoirs. The reaction portion 706 is filled with polystyrene beads on which a mouse anti-human AFP antibody is immobilized. The beads have a diameter of 45 µm. The analysis system is composed of the channel substrate 701, a pump 712, and a leak valve 713. The reservoirs 702 and 703 are connected to the pump 712 via the leak valve 713. A fluorescence microscope 711 is arranged so as to sandwich the reaction portion 706.

Blood (20 µL) as an analysis sample solution and 20 mM phosphate buffer solution (pH=7.0, $KH_2PO_4$—$Na_2HPO_4$) as a washing solution are prepared.

At first, blood cells in the sample are separated. Then, the blood-cell-removed sample is mixed with the labeled antibody to perform the antigen-antibody reaction in the reaction portion 706. After the reaction, the reaction solution is conveyed to the waste liquid portion 707. The blood sample in the reservoir 702 and the labeled antibody in the reservoir 703 migrate in the channels by means of the force of phosphate buffer solution conveyed by the pump.

The predetermined values for closing the valves will be here described. The pump for conveying a sample is operated so as to control the flow rate. Additionally, the valves are designed so that a higher flow rate is necessary for closing the valve disposed closer to the pump in the channel. The flow rates for closing the valves 708 and 710 are each 500 µL/min, and the flow rate for closing the valve 709 is 50 µL/min.

Flow rates of the sample are as follows: In the process for separating blood cells, the flow rate is 1000 µL/min; in the process for mixing the sample and the labeled antibody, the flow rate is 100 µL/min; and in the process for conveying the sample after the reaction, the flow rate is 10 µL/min.

Figure 8A:
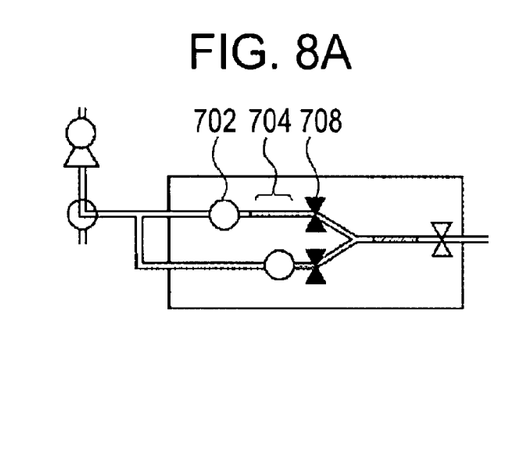
FIGS. 8A-8D are schematic diagrams showing a method for conveying fluid according to the embodiment of the present invention shown in FIG. 7.

The analysis process is as follows: As shown in FIG. 8A, the sample is injected from the reservoir 702 into the separation portion 704 at a flow rate of 1000 µL/min. The sample from which blood cells are removed is conveyed to the valve 708, and, simultaneously, the labeled antibody in the reservoir 703 is conveyed to the valve 710. Since the valves 708 and 710 are each closed at a flow rate of 500 µL/min, the valves 708 and 710 are closed and the conveying of the sample and the labeled antibody are terminated.

Figure 8B:
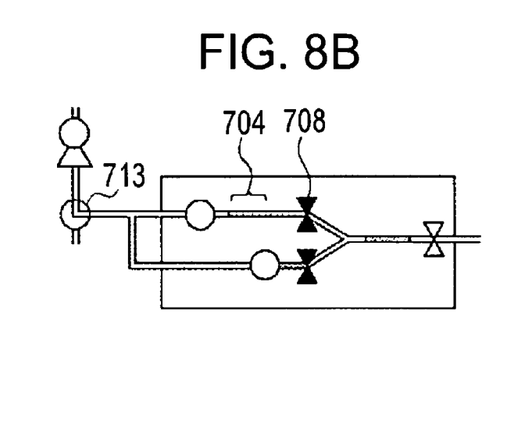

Next, as shown in FIG. 8B, the valves 708 and 710 are opened by opening the leak valve 713.

Then, the sample and the labeled antibody are each conveyed at a flow rate of 100 µL/min. At this stage, since the flow rate is lower than that for closing each of the valves 708 and 710, the sample and the labeled antibody are simultaneously conveyed to the mixing portion 705. This causes the antigen-antibody reaction between the labeled rabbit anti-human AFP antibody and human AFP in the sample.

Figure 8C:
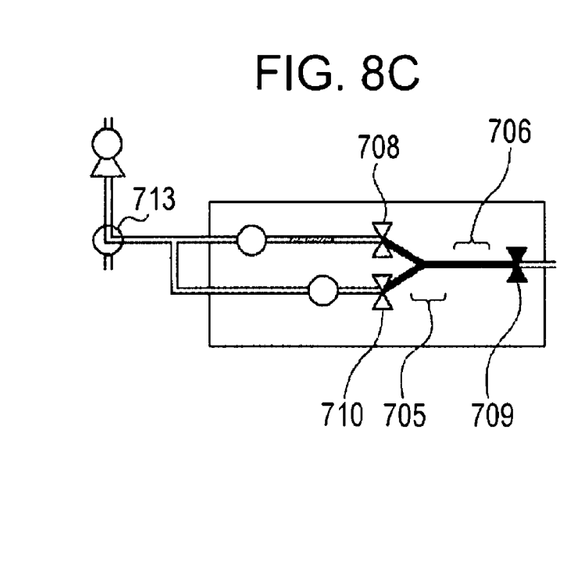

As shown in FIG. 8C, a mixture of the sample and the labeled antibody is injected into the reaction portion 706 at a flow rate of 100 µL/min. Since the valve 709 is closed at a flow rate of 50 µL/min, the valve 709 is closed to terminate the conveying of the mixture. At this stage, the antigen-antibody reaction occurs between human AFP bound to the labeled antibody and the mouse anti-human AFP antibody immobilized on the beads. The mixture is held at the reaction portion 706 for 10 min for the reaction. Then, the leak valve 713 is opened to open the valve 709.

Figure 8D:
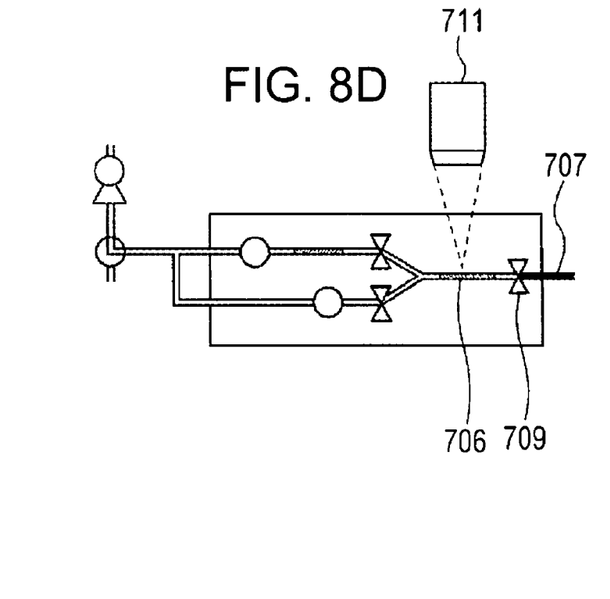

As shown in FIG. 8D, the blood sample and the labeled antibody, which do not participate in the reaction, are conveyed to the waste liquid portion 707 at a flow rate of 10 µL/min. Then, the reaction portion 706 is washed with the phosphate buffer solution conveyed by the pump. The results of the antigen-antibody reaction can be confirmed under the fluorescence microscope 711 by examining fluorescence from FITC of the labeled antibody bound on the bead surfaces via human AFP.

As described above, with the fluid-conveying apparatus according to the present invention, fluid can be conveyed with a simple constitution. Since the valves have a structure to be resistant to pressure, it is possible to precisely control the fluid even if the conveying pressure is high. In particular, the present invention is useful in the field of µ-TAS, which requires the reduction in size of the entire system.

In the fluid-conveying apparatus according to the present invention, the valve can be readily closed and opened by applying conveying pressure or relieving the conveying pressure, so the conveying of fluid can be controlled with a simple constitution. With the resistance to pressure, the conveying of fluid under high pressure can be also precisely controlled. In particular, the fluid-conveying apparatus can be used for controlling the fluid flow in a downsized analytical system (µ-TAS) for performing chemical analysis or chemical reaction on a chip.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-343355 filed Nov. 29, 2004, which is hereby incorporated by reference herein in its entirety.

What is claimed is:

1. A fluid-conveying apparatus for conveying fluid using a micro-channel for the fluid to flow, the apparatus comprising:
    pressure-generating means for generating pressure for conveying the fluid through the micro-channel, with the micro-channel having a broad channel region and a narrow channel region;
    a plurality of micro-processing areas for processing the fluid or a sample conveyed through the micro-channel;
    a micro-valve which is disposed between two of the plurality of the processing areas and controls the fluid flow therethrough, wherein the micro-valve comprises a shielding plate elastically supported in the broad channel region, the shielding plate operably moves toward the narrow channel region to interrupt a flow of the fluid from the broad channel region to the narrow channel region, the shielding plate being operable based only on the pressure difference between an upstream side of the fluid flow and a downstream side of the fluid flow; and
    pressure-relieving means for relieving pressure in the channel,
    wherein the channel, the processing area and the valve comprise substrates having a silicon layer or a silicon oxide layer.

2. The fluid-conveying apparatus according to claim 1, further comprising a plurality of micro-valves in the micro-channel, wherein the plurality of micro-valves have different threshold values such that when the pressure difference between an upstream side and a downstream side of each of the plurality of micro-valves is greater than the threshold therefor, the fluid flow therethrough is interrupted.

3. The fluid-conveying apparatus according to claim 2, wherein the plurality of micro-valves comprises a first valve and a second valve, wherein the first valve is upstream of the second valve in the micro-channel, and the threshold value for the first valve for interrupting the fluid flow is higher than that of the second valve.

4. The fluid-conveying apparatus according to claim 1, wherein the micro-valve comprises a spring elastically suspending the shielding plate, wherein the shielding plate is displaced by a pressure difference between the upstream side and the downstream side with respect to the micro-valve, and wherein the shielding plate is sufficiently displaced to shield the micro-channel when the pressure difference is equal to or higher than the predetermined value.

5. The fluid-conveying apparatus according to claim 4, wherein the shielding plate is displacebly provided in the broad channel region, and wherein the micro-valve interrupts the fluid flow to the narrow channel region by displacing the shielding plate so as to shield the narrow channel region.

6. The fluid-conveying apparatus according to claim 5, wherein the broad channel region is upstream of the narrow channel region.

7. The fluid-conveying apparatus according to claim 1, wherein a chemical reaction or chemical synthesis is performed with the sample conveyed through the micro-channel in the plurality of processing areas.

8. The fluid-conveying apparatus according to claim 7, wherein the fluid-conveying apparatus comprises a micro-analysis system comprising a substrate in which the micro-channel is disposed and on which the pressure-generating means, the plurality of processing areas, the micro-valve, and the pressure-relieving means are disposed.

9. The fluid-conveying apparatus according to claim 8, wherein the micro-analysis system comprises a plurality of said substrates, wherein in at least one of the substrates the micro-channel is formed, wherein in at least another one of the substrates the micro-valve is formed.

10. A fluid-conveying apparatus according to claim 1, wherein the biasing members are springs.

11. A fluid-conveying apparatus for conveying fluid, the apparatus comprising:
a fluid flowing micro-channel, with the micro-channel having a broad channel region and a narrow channel region;
a pressure generator for generating pressure for conveying the fluid through the micro-channel;
a plurality of processing areas in the micro-channel for processing the fluid or a sample conveyed through the micro-channel;
a micro-valve disposed between two of the plurality of processing areas and controlling the fluid flow through the broad channel region and the narrow channel region, the micro-valve comprising a shielding plate disposed in the broad channel region and a biasing member supporting the shielding plate, the shielding plate operably moves toward the narrow channel region to interrupt the flow of fluid from the broad channel region to the narrow channel region based only on the pressure difference between an upstream side of the fluid flow and a downstream side of the fluid flow; and
pressure-relieving member to relieve pressure in the channel.

12. The fluid-conveying apparatus according to claim 11, further comprising a plurality of micro-valves in the micro-channel, wherein the plurality of micro-valves have different threshold values such that when the pressure difference between an upstream side and a downstream side of each of the plurality of micro-valves is greater than the threshold therefore, the fluid flow therethrough is interrupted.

13. The fluid-conveying apparatus according to claim 12, wherein the plurality of micro-valves comprises a first valve and a second valve, wherein the first valve is upstream of the second valve in the micro-channel, and the threshold value for the first valve for interrupting the fluid flow is higher than that of the second valve.

14. The fluid-conveying apparatus according to claim 13, wherein the broad channel region is upstream of the narrow channel region.

15. The fluid-conveying apparatus according to claim 11, wherein a chemical reaction or chemical synthesis is performed with the sample conveyed through the micro-channel in the plurality of processing areas.

16. The fluid-conveying apparatus according to claim 15, wherein the fluid-conveying apparatus comprises a micro-analysis system comprising a substrate in which the micro-channel is disposed and on which the pressure generator, the plurality of processing areas, the micro-valve, and the pressure-relieving member are disposed.

17. The fluid-conveying apparatus according to claim 16, wherein the micro-analysis system comprises a plurality of the substrates, wherein in at least one of the substrates the channel is formed, wherein in at least another one of the substrates the micro-valve is formed.

* * * * *